Patented Nov. 4, 1941

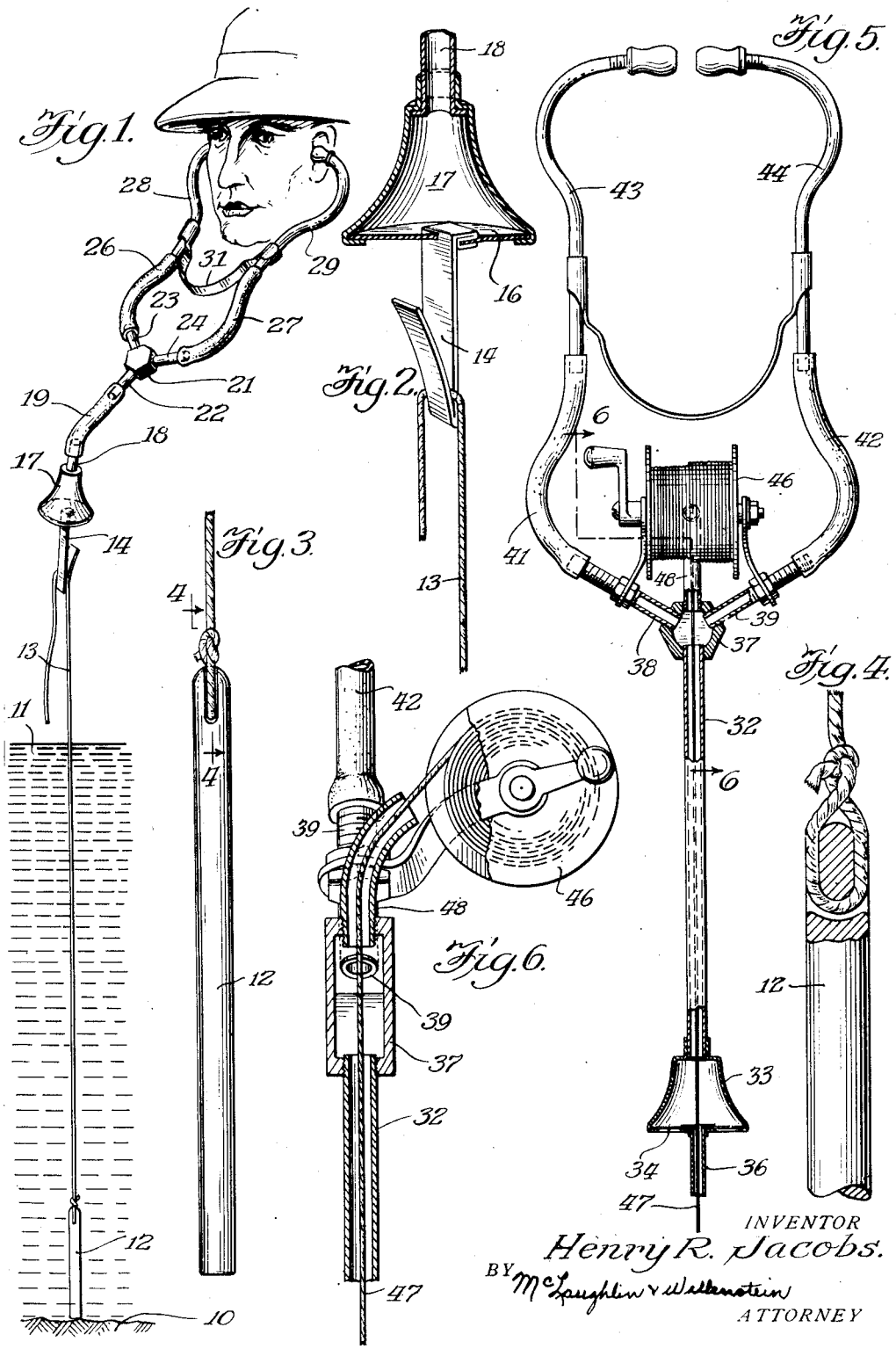

2,261,375

UNITED STATES PATENT OFFICE 2,261,375

APPARATUS FOR DETERMINING THE CHARACTERISTICS OF LAKE BEDS AND THE LIKE

Henry R. Jacobs, Chicago, Ill.

Application April 15, 1938, Serial No. 202,240

6 Claims. (Cl. 73—51)

My invention relates to means for determining characteristics or conditions of bottoms underlying bodies of water such as lakes or streams.

Because of the feeding and other habits of fish, it is well known that certain species may be found in different locations generally characterized by peculiarities of the bottom underlying the lake, river or other body of water which they inhabit. For this reason, fishermen are usually very definitely interested in the type of bottom over which they are fishing as well, of course, as the depth of the water or, speaking in terms of the bottom again, the distance which the bottom is found below the surface. Certain fish are known to seek weed beds. Other fish seek flat, muddy bottoms. Still other fish are found in sand and gravel while many varieties seek a rocky or stony bottom, sometimes where there are ledges of rock and unusual formations such as sharp slopes and the like. As already mentioned, fishermen looking for a particular type of fish are keenly interested in the condition of the bottom, and use various methods, some amounting merely to observation, for the purpose of getting a general idea of their location.

The object of my invention is to provide an improved means for affording the fishermen or other person who may be interested a full understanding of substantially all characteristics of a lake or river bottom.

A further object is to provide simple and easily operable means for determining the existence of such bottoms as mud bottoms, sandy bottoms, gravelly bottoms, stony bottoms and the like and also, where desired, the general contour of such bottoms.

In accordance with the general features of my invention, I utilize a member capable of having some vibration imparted thereto, which vibration is generally dependent upon the characteristics of the object or objects against which it engages. I provide means also for translating these vibrations to the ear in the form of sound, specifically by causing a vibration of a column of air with which the ear is placed in contact. The simplest and an adequate vibrating member is an ordinary metal rod, for example, a steel rod, and the vibrations thereof are transmitted to a column of air through a taut line suspended between a diaphragm and the rod, the diaphragm being in communication with the column of air. The diaphragm possesses the functions of amplifying the vibrations, and in some part producing vibrations of its own as the result of the vibratory member engaging and disengaging various objects, and also engaging objects having different resistances.

Other specific objects and features of the invention will be apparent from a consideration of the following detailed description taken with the accompanying drawing wherein Fig. 1 is an elevational view showing one form of equipment made in accordance with my invention, and illustrating the manner in which my method is practiced, Fig. 2 is an enlarged sectional view partly in elevation showing features of the diaphragm and related structure, Fig. 3 is an elevational view showing the general construction of the vibrating rod, Fig. 4 is a fragmentary sectional view taken on the line 4—4 of Fig. 3, Fig. 5 is an elevational view partly in section illustrating a modification of the apparatus, and Fig. 6 is a sectional view partly in elevation taken along the line 6—6 of Fig. 5.

In carrying out my invention it is to be understood that the apparatus may take various forms, and while for practical purposes I show means for splitting the vibrating column of air to bring it to both ears, only a single air column to one ear may function with equivalent satisfaction providing, of course, that suitable means be employed to prevent interference noises from reaching the free ear when such noises may be of unusual intensity.

Referring now to the drawing:

I indicate a bottom 10 over which a body of water 11 lies. A rod 12 is adapted to engage against the bottom and is suspended from a line 13. This line is secured at its upper end to a fastening member 14 secured to a diaphragm 16. The diaphragm is supported in the flared end of a bell 17 having at its smaller end a short pipe 18 to which a flexible tube 19 is connected. A hollow body 21 has short pipes 22, 23 and 24 communicating with its interior. Flexible tubes 26 and 27 are connected to the pipes 23 and 24, respectively, and to ear pieces 28 and 29. These ear pieces are also hollow so that the construction results in the provision of a column of air communicating with the diaphragm 16 and split at the hollow body 21 into two columns of air which through the ear pieces are placed in communication with the ears of the person operating the device. A usual type of spring means 31 may be employed to hold the ear pieces in position against the ears.

The fastening member 14 obviously may take various shapes. Since the depth of the water may vary I prefer to employ a fastening member which affords means for quickly adjusting the length of line between the diaphragm and rod 12. In the form shown, the fastening member is formed of spring metal bent on itself to form a relatively tight V slot which holds the line with sufficient tightness when the line is merely wedged in the manner shown into the apex of the V.

To avoid the possibility of the rod 12 entering crevices between rocks and becoming lodged therein in such a way as to make extrication impossible, I slot the upper part of the rod above the aperture through which the line passes as indicated generally in Fig. 4, so that the rod comprises substantially an extension of the line which holds it, and in case the rod should drop in a crevice it will be extricated readily by virtue of the fact that the pull on the line will be substantially directly along the axis of the rod and there will be little, if any, tendency for it to function as a toggle and wedge itself tightly.

In the modification of the apparatus shown in Figs. 5 and 6 I employ a rigid tube 32 of somewhat greater length than the corresponding connection shown in Fig. 1, this tube communicating with the inside of the bell 33 in the flared end of which diaphragm 34 is supported. A small tubular member 36 is suitably secured at the center of the diaphragm so that the tubular opening in the member 36 communicates with the inside of the diaphragm. A hollow body 37 is formed to receive one end of the tube 32 so as to place it inside of the tube 32 in communication with the interior of the hollow body. Center pipes 38 and 39 also communicate with this hollow member and through flexible tubes 41 and 42 communicate with ear pieces 43 and 44 formed substantially the same as the corresponding ear pieces in the first described embodiment. To the pipes 38 and 39 by suitable brackets, I secure a reel 46 on which a line 47 generally similar to an ordinary fish line is adapted to be reeled. The line from the reel 46 extends through a short arcuate pipe 48 through the hollow body 37, tube 32, bell 33 and small tubular member 36.

The embodiment shown in Figs. 5 and 6 functions in substantially the same way as the embodiment previously described. By the use of the reel I provide somewhat more available means for quickly adjusting the line to the depth of the body of water in which operations are taking place. The reel may be permitted to turn by the weight of the rod 12 until it strikes the bottom, meanwhile holding the ear pieces in the ears, and the instant at which the rod strikes the bottom as well as some idea of the characteristics of the bottom may be determined through sound.

At the time the rod strikes the bottom, the line is prevented from running out farther by the use of suitable brake means ordinarily found on reels or in any other suitable manner as by looping the line around the handle with which the reel is turned. Because of the relatively long tube 32 which may be projected somewhat in front of the user of the device, the rod may be given a bobbing motion readily without further manipulation of the length of the line, and the position of the rod 12 may be changed on the bottom so as easily to explore a somewhat large area. It is necessary, of course, that the device be held so that the weight on the line is suspended from the diaphragm 34, otherwise the vibrations would not be communicated to the diaphragm. It is to be understood that some of the features shown in the second embodiment may obviously be incorporated in the first embodiment without the exercise of invention. For example, in place of a flexible coupling 19, the relatively rigid coupling may be employed in the first described embodiment so that with this form also the depth may be somewhat more readily allowed for and somewhat greater facility obtained in examining relatively larger areas.

What I claim as new and desire to protect by Letters Patent of the United States is:

1. The combination for determining the condition of a bottom beneath bodies of water, comprising a readily vibratable metal rod adapted to sink readily and strike one end thereof against the bottom whereby to vibrate in accordance with objects on the bottom against which it strikes, means for amplifying such vibrations, a taut line between said weighted means and amplifying means, and means for carrying sound vibrations from said amplifying means to the ear.

2. The combination for determining the condition of a bottom beneath bodies of water, comprising a metal rod having a hole near one end, a diaphragm, a line secured to said diaphragm and connected to the end of said rod at said hole whereby when said line is taut vibrations resulting from striking said rod against the bottom are communicated to said diaphragm, and means for communicating vibrations of said diaphragm to the ear.

3. The combination for determining the characteristics of a bottom beneath a body of water, comprising a member capable of vibrating in accordance with an object it engages, a diaphragm associated with a column of air, a line interconnecting said diaphragm and member, means for quickly adjusting the length of line between the diaphragm and body, and means for placing the ear in communication with the said column of air.

4. The combination for determining the characteristics of a bottom beneath a body of water, comprising a vibratable rod, a line secured thereto, a diaphragm, means for supporting said diaphragm to form a column of air at one side thereof, a reel on which said line is adapted to be reeled, and means for associating said line between the reel and rod with said diaphragm so that when taut vibrations of the rod are communicated to said diaphragm.

5. The combination for determining the condition of a bottom beneath bodies of water, comprising a diaphragm, a bell shaped member engaging said diaphragm to form an enclosed air space, means forming a column of air in communication with said air space, said means adapted for attachment to an ear of an operator, a vibratable metal rod, a flexible line attached to one end thereof, and a fastening member for the line secured to the center of the diaphragm and projecting therefrom, said fastening member having a portion of spring material defining a tight V slot, whereby said line may be quickly lodged in said V slot for attachment, and quickly removed therefrom.

6. The combination for determining the condition of a bottom beneath bodies of water, comprising a diaphragm, a bell shaped member engaging said diaphragm to form an enclosed air space, means forming a column of air in communication with said air space, said means adapted for attachment to an ear of an operator, a reel mounted on said means, a tubular member secured at the center of the diaphragm, a line coiled on said reel and extending through said bell shaped member, diaphragm and tubular member, and a vibratable metal rod having one end secured to an end of said line extended through said tubular member, whereby vibration of said rod as it strikes an object will be conveyed to the diaphragm, and thence by sound waves to the ear, and whereby the length of the line extended may be quickly adjusted to irregularities in the bottom.

HENRY R. JACOBS.